United States Patent
Bolka

(10) Patent No.: US 10,251,368 B1
(45) Date of Patent: Apr. 9, 2019

(54) ANIMAL LITTER AND METHODS OF MAKING AND USING THE SAME

(71) Applicant: Gail Bolka, Hewitt, NJ (US)

(72) Inventor: Gail Bolka, Hewitt, NJ (US)

( * ) Notice: Subject to any disclaimer, the term of this patent is extended or adjusted under 35 U.S.C. 154(b) by 0 days.

(21) Appl. No.: 15/839,593

(22) Filed: Dec. 12, 2017

(51) Int. Cl.
*A01K 1/01* (2006.01)
*A01K 1/015* (2006.01)
*A01K 1/035* (2006.01)
*B01J 20/28* (2006.01)

(52) U.S. Cl.
CPC .......... *A01K 1/0152* (2013.01); *A01K 1/0114* (2013.01); *A01K 1/011* (2013.01); *A01K 1/035* (2013.01); *B01J 20/28016* (2013.01)

(58) Field of Classification Search
CPC .. A01K 1/0152; A01K 1/0155; A01K 1/0114; A01K 1/035; A01K 1/011; B01J 20/28016
USPC .......................................................... 119/171
See application file for complete search history.

(56) References Cited

U.S. PATENT DOCUMENTS

| | | | | |
|---|---|---|---|---|
| 4,311,115 A * | 1/1982 | Litzinger | A01K 1/0155 | 119/172 |
| 4,560,527 A * | 12/1985 | Harke | A01K 1/0155 | 119/172 |
| 4,619,862 A * | 10/1986 | Sokolowski | A01K 1/0152 | 119/172 |
| 4,621,011 A * | 11/1986 | Fleischer | A01K 1/0152 | 119/172 |
| 4,676,196 A * | 6/1987 | Lojek | A01K 1/0152 | 119/171 |
| 5,019,564 A * | 5/1991 | Lowe | A01K 1/0155 | 424/413 |
| 5,352,780 A * | 10/1994 | Webb | C02F 1/681 | 524/35 |
| 5,358,607 A * | 10/1994 | Ellis | A01K 1/0154 | 119/172 |
| 5,743,213 A * | 4/1998 | Fujiura | A01K 1/0154 | 119/171 |
| 5,909,718 A * | 6/1999 | Sheehan | A01K 1/0155 | 119/172 |
| 6,287,496 B1 * | 9/2001 | Lownds | C05F 11/02 | 264/118 |
| 6,371,050 B1 * | 4/2002 | Mochizuki | A01K 1/0154 | 119/172 |
| 6,745,720 B2 * | 6/2004 | Rasner | A01K 1/0152 | 119/171 |
| 7,905,987 B2 * | 3/2011 | Kennedy | D21H 17/01 | 119/172 |
| 9,549,533 B2 * | 1/2017 | Raymond | A01K 1/0155 | |
| 2004/0079292 A1 * | 4/2004 | Mochizuki | A01K 1/0155 | 119/171 |
| 2005/0132968 A1 * | 6/2005 | Swank | A01K 1/0152 | 119/171 |
| 2006/0112894 A1 * | 6/2006 | Ikegami | A01K 1/0152 | 119/171 |
| 2010/0136128 A1 * | 6/2010 | Hurwitz | A01K 1/0152 | 424/499 |
| 2011/0315088 A1 * | 12/2011 | Yoder | A01K 1/015 | 119/526 |
| 2013/0029040 A1 * | 1/2013 | Ito | A01K 1/0152 | 427/212 |
| 2014/0190420 A1 * | 7/2014 | Ito | A01K 1/0155 | 119/172 |
| 2014/0305608 A1 * | 10/2014 | Okamoto | A01K 1/0155 | 162/218 |
| 2015/0013615 A1 * | 1/2015 | Reynolds | A01K 15/025 | 119/707 |
| 2016/0316713 A1 * | 11/2016 | Mochizuki | A01K 1/0155 | |
| 2017/0000079 A1 * | 1/2017 | Lau | A01K 1/0152 | |
| 2017/0188540 A1 * | 7/2017 | Lipscomb | A01K 1/0155 | |

* cited by examiner

*Primary Examiner* — Joshua D Huson
(74) *Attorney, Agent, or Firm* — Scherrer Patent & Trademark Law, P.C.; Stephen T. Scherrer; Monique A. Morneault

(57) ABSTRACT

Animal litter is provided, namely litter that may be utilized by small animals, such as cats, rabbits, and other animals that use litter for urination and defecation therein. The litter comprises all-natural ingredients and is biodegradable, is environmentally-friendly, dust-free, odorless, effectively clumps when used for urination or with other fluids, and does not stick to paws or fur. Methods of making and using the same are further provided.

10 Claims, No Drawings

ANIMAL LITTER AND METHODS OF MAKING AND USING THE SAME

TECHNICAL FIELD

The present invention relates to animal litter, namely litter that may be utilized by small animals, such as cats, rabbits, and other animals that use litter for urination and defecation therein. The litter comprises all-natural ingredients and is biodegradable, is environmentally-friendly, dust-free, odorless, effectively clumps when used for urination or with other excretory fluids, and does not stick to paws or fur. Methods of making and using the same are further provided.

BACKGROUND

Animal litter is, of course, widely known and utilized by many, especially those with indoor animals, such as cats, rabbits, or other like animals. Often, pet owners utilize a litter box, sometimes called a sandbox, litter tray, litter pan, or catbox, to provide a dedicated area for a pet to excrete, either instinctively or through training. Typically, indoor pets can have free roam of a home but typically cannot or do not go outside to relieve themselves. Indeed, many owners of these animals prefer not to let them roam outside for fear that they might succumb to outdoor dangers, such as weather, wildlife or traffic. A litter box makes it possible to shelter pets from these risks.

In the wild, cats naturally excrete in soft or sandy soil for easy burial. They use their paws in a backward sweeping motion to cover their feces and urine. To stimulate this instinctive desire, a litter box's bottom is filled typically with an inch or more of litter box filler. Litter box filler is often a loose, granular material that absorbs moisture and odors such as ammonia.

There are many types of litter box filler materials that are used. A litter is often intended to provide a medium for absorbing liquid waste, such as urine. Likewise, litter is further intended to contain odors, and many litters are designed to clump together so the clumps may be easily removed and the liquid waste better contained. Sand, or a silicate material, is often used for litter, especially cat litter. However, sand may be messy, may create dust, may fail to effectively absorb odors, and may stick to animals' paws and fur, allowing the animals to track the sand around the home.

Other like litter materials may include conventional clay, but these also cause many problems, like sand. Clays tend to also create dust, which can be breathed by the animal or people, tend to stick to paws and fur allowing the clays to be tracked around the home, and may not be easily disposed or biodegraded in the environment. Moreover, as noted above, the clay dust may stick to paws and fur and may be ingested by the animals as they clean themselves. Oftentimes, the clay used in animal litter is strip-mined, which is harmful to the environment. Clay can also be quite heavy and difficult to carry and transport.

Corn cob, or other corn-based litter, may also be used, but these materials are also quite messy. It is often the case that the granules of litter based on corn again stick to paws and fur, and are tracked around the home. Corn-based litter further contains corn dust that may stick to the sides of a litter box due to static charge, and may consequently be transferred to animals' fur or breathed. While corn-based litter may clump, the clump residue often results in tiny clumps that slip through litter scoops so are difficult to scoop, thereby remaining in the litter box, creating an unsanitary and unhealthy environment for the animals. Corn-based litter granules may also become embedded in carpeting or within grooves or cracks in flooring, and typically require tedious cleaning. In addition, because corn-based litter is also often edible and the smell may be attractive to animals, pets may consume the litter instead of using the litter for excretory functions.

Another litter material includes pulverized wood that may be shaped into pellets. However, these pellets often come apart when scratched by animals, such as cats. Thus, irregularly shaped pellet segments may stick to paws and fur, and may cause a mess within a home as an animal moves from the litter box.

Many litters having dust associated therewith, such as the silicate, clay, wood, or corn-based litters, may come in bags or boxes that must typically be poured into litter boxes. Pouring this material into litter boxes may cause the dust to billow, which is unhealthy for animals and humans to breathe.

Many litters further utilize odor absorbers and/or fragrances to attempt to remove and/or cover up the pungent smell of animal urine and feces. However, in many cases, the odor absorbers are not healthy for animals, and the fragrances can be strong, causing animals with sensitive senses of smell to avoid the litter box containing these materials.

A need, therefore, exists for improved animal litter and methods of making and using the same. More specifically, a need exists for improved animal litter that reduces litter messes, effectively clumps together, and reduces odor.

In addition, a need exists for improved animal litter made from all-natural, biodegradable materials. Moreover, a need exists for improved animal litter that is environmentally-friendly and can be made from recycled materials.

Further, a need exists for improved animal litter that will not stick to paws or fur. Still further, a need exists for improved animal litter that will not be tracked around a home after an animal has used a litter box.

SUMMARY OF THE INVENTION

The present invention relates to animal litter, namely litter that may be utilized by small animals, such as cats, rabbits, and other animals that use litter for urination and defecation therein. The litter comprises all natural ingredients and is biodegradable, is environmentally-friendly, dust-free, odorless, effectively clumps when used for urination or with other fluids, and does not stick to paws or fur. Methods of making and using the same are further provided.

To this end, in an embodiment of the present invention, animal litter is provided. The animal litter comprises: a plurality of shapes made from an amount of paper dust and corn starch, bound together with an amount of water.

In an embodiment, the shapes are regular.

In an embodiment, the shapes are uniformly-sized.

In an embodiment, the shapes are both uniform in both shape and size.

In an embodiment, the shapes are spheres.

In an embodiment, the spheres are about ¼ inch or less in diameter.

In an embodiment, the spheres are formed by blending paper dust, corn starch and water together to form a paste, and molding the paste into the shapes.

In an embodiment, the shapes formed by blending paper dust, corn starch and water are spheres.

In an embodiment, the spheres are further formed by drying the shapes after molding the paste into the shapes.

In an embodiment, the shapes are dried by adding heat to the shapes.

In an embodiment, the shapes are dried by reducing air pressure around the shapes.

In an embodiment, the shapes are dried by both adding heat to the shapes and reducing air pressure around the shapes.

In an alternate embodiment of the present invention, a method of forming a plurality of shapes of animal litter is provided. The method comprises the steps of: blending an amount of paper dust, corn starch and water to form a paste; molding the paste into a plurality of shapes; and drying the shapes to form a plurality of final products.

In an embodiment, the final products are regular in shape.

In an embodiment, the final products are uniform in both shape and size.

In an embodiment, the final products are spheres.

In an embodiment, the spheres are ¼ inch or less in diameter.

In an embodiment, the paste is formed with between about 40% by weight and about 90% by weight paper dust, between about 5% by weight and about 25% by weight corn starch, and between about 5% by weight and about 40% by weight water.

In an embodiment, the paste is formed with between about 45% by weight and about 85% by weight paper dust, between about 10% by weight and about 20% by weight corn starch, and between about 10% by weight and about 35% by weight water.

In an embodiment, the paste is formed with between about 50% by weight and about 75% by weight paper dust, between about 12.5% by weight and about 15% by weight corn starch, and between about 15% by weight and about 30% by weight water.

It is, therefore, an advantage and objective of the present invention to provide improved animal litter and methods of making and using the same.

More specifically, it is an advantage and objective of the present invention to provide improved animal litter that reduces litter messes, effectively clumps together, and reduces odor.

In addition, it is an advantage and objective of the present invention to provide improved animal litter made from all-natural, biodegradable materials.

Moreover, it is an advantage and objective of the present invention to provide improved animal litter that is environmentally-friendly and can be made from recycled materials.

Further, it is an advantage and objective of the present invention to provide improved animal litter that will not stick to paws or fur.

Still further, it is an advantage and objective of the present invention to provide improved animal litter that will not be tracked around a home after an animal has used a litter box.

Additional features and advantages of the present invention are described in, and will be apparent from, the detailed description of the presently preferred embodiments and from the drawings.

DETAILED DESCRIPTION OF THE PRESENTLY PREFERRED EMBODIMENTS

The present invention relates to animal litter, namely litter that may be utilized by small animals, such as cats, rabbits, and other animals that use litter for urination and defecation therein. The litter comprises all-natural ingredients and is biodegradable, is environmentally-friendly, dust-free, odorless, effectively clumps when used for urination or with other fluids, and does not stick to paws or fur. Methods of making and using the same are further provided.

The animal litter of the present invention comprises a plurality of spheres comprising a mixture of recycled paper dust, corn starch and water, blended together to form a paste, which is then formed into the afore-mentioned spheres. The spheres may be any size, but may preferably be less than ¼ inch in diameter. Likewise, although the preferred shape of the litter is a sphere, the litter may be any shape and size apparent to one of ordinary skill in the art, including ovoid or irregularly-shaped. Spherical litter may benefit from being least likely to stick to paws and fur due to its regular and uniform shape. The size is further useful to allow non-clumped spheres, i.e., spheres that have not been contacted with excretory fluids, to easily pass through litters scoops or sieves. The spheres are preferably uniform in size and shape, allowing uniform spacing between the spheres.

As mentioned above, the spheres may effectively absorb fluids, such as urine, and may further clump together when they come into contact with a fluid, such as urine or other excretory fluids. As the spheres form clumps, the clumps may be easily removed from the litter box with a litter scoop or sieve. The remaining spheres that have not clumped together may thus be reused. Moreover, the spheres may be dust-free, both in the packaging so that the spheres do not cause a dust cloud to form when poured therefrom, and while in a litter box, making the spheres safer for pets and humans.

In a preferred embodiment, the spheres of the present invention useful as animal litter may be made from a blend of paper dust, such as recycled paper or paper dust, corn starch and water that may be formed into the desired shape, such as spherical, and dried to form the final spherical product. Other ingredients may further be used, such as fragrances and the like; however, the most preferable material is simply a combination of these three ingredients.

The spheres are preferably formed into a paste that may be used to form the final product shape. The water is then driven off, typically by drying over time although heat and reduced air pressure may be added to accelerate the process, thereby forming the final dry product.

In a preferred embodiment, the spheres of the present invention may be made from a paste comprising between about 40% by weight and about 90% by weight recycled paper dust, which may be formed from any cellulosic paper that is ground to particulate size. More preferably, the spheres of the present invention may be made from a paste comprising between about 45% by weight and about 85% by weight recycled paper dust. Most preferably, the spheres of the present invention may be made from a paste comprising between about 50% by weight and about 75% by weight recycled paper dust.

Likewise, in a preferred embodiment, the spheres of the present invention may be made from a paste comprising between about 5% by weight and about 25% by weight corn starch. More preferably, the spheres of the present invention may be made from a paste comprising between about 10% by weight and about 20% by weight corn starch. Most preferably, the spheres of the present invention may be made from a paste comprising between about 12.5% by weight and about 16% by weight corn starch.

Moreover, in a preferred embodiment, the spheres of the present invention may be made from a paste comprising the balance water. More specifically, the spheres of the present invention may be made from a paste comprising between about 5% by weight and about 40% by weight water. More preferably, the spheres of the present invention may be made from a paste comprising between about 10% by weight and about 35% by weight water. Most preferably, the spheres of the present invention may comprise between about 15% by weight and about 30% by weight water.

The above-described amounts of paper dust, corn starch and water and blended together to form a paste that may be used in molds to form a plurality of spheres, or other like shapes, apparent to one of ordinary skill in the art. Specifically, the paste may be injected into spherical molds of ¼ inch or less to form the spheres of the present invention. As noted above, the water may then be driven off, either via air drying, or via application of heat and/or reduced pressure. In an embodiment, the spheres are disposed within a litter box to an amount effective to be used by an animal for excretion therein, such as in a bed of an inch or two, or more depending on the requirements and the application.

The following examples are provided showing particular compositions of materials useful to form a paste of the present invention for forming the spheres thereof. The examples are not meant to be limiting in any manner, and are presented herein as exemplary embodiments of the present invention.

| Material | Amount, by weight |
| --- | --- |
| Recycled paper dust | 61.5% |
| Corn starch | 15.4% |
| Water (balance) | 23.1% |

| Material | Amount, by weight |
| --- | --- |
| Recycled paper dust | 66.7% |
| Corn starch | 13.3% |
| Water (balance) | 20% |

It should be noted that various changes and modifications to the presently preferred embodiments described herein will be apparent to those skilled in the art. Such changes and modifications may be made without departing from the spirit and scope of the present invention and without diminishing its attendant advantages. Further, references throughout the specification to "the invention" are nonlimiting, and it should be noted that claim limitations presented herein are not meant to describe the invention as a whole. Moreover, the invention illustratively disclosed herein suitably may be practiced in the absence of any element which is not specifically disclosed herein.

I claim:

1. A method of forming animal litter comprising the steps of:
    forming a plurality of spheres wherein the spheres are formed by blending recycled paper dust, corn starch and water together to form an intermediate blend, wherein the intermediate blend consists of at least 12.5% by weight corn starch and less than 40% by weight water, and
    inserting the intermediate blend into a plurality of spherical molds to form the plurality of spheres, wherein all of the spheres of the animal litter are uniform in both size and shape, and further wherein all of the plurality of spheres are the same size selected from the range of ¼ inch or less in diameter; and
    wherein the spheres are further formed by drying the spheres after molding the intermediate blend into the spheres.

2. The method of claim 1 wherein the spheres are dried by adding heat to the spheres.

3. The method of claim 1 wherein the spheres are dried by reducing air pressure around the spheres.

4. The method of claim 1 wherein the spheres are dried by adding heat to the spheres and reducing air pressure around the spheres.

5. A method of forming a plurality of spheres of animal litter comprising the steps of:
    forming an intermediate blend consisting of an amount of paper dust, corn starch and water, wherein the intermediate blend consists of at least 12.5% by weight corn starch and less than 40% by weight water;
    inserting the intermediate blend into a plurality of spherical molds to form a plurality of spheres, wherein all of the plurality of spheres are uniform in both size and shape;
    drying the spheres to form a plurality of final products.

6. The method of claim 5 wherein the step of inserting the blend into a plurality of spherical molds to form a plurality of spheres further comprises molding the spheres so that they are regular in shape.

7. The method of claim 5 wherein the step of inserting the blend into a plurality of spherical molds to form a plurality of spheres further comprises molding the spheres so that they are ¼ inch or less in diameter.

8. The method of claim 5 wherein the blend is formed with between 40% by weight and 90% by weight paper dust, between 5% 12.5% by weight and 25% by weight corn starch, and between 5% by weight and 40% by weight water.

9. The method of claim 5 wherein the blend is formed with between 45% by weight and 85% by weight paper dust, between 10% 12.5% by weight and 20% by weight corn starch, and between 10% by weight and 35% by weight water.

10. The method of claim 5 wherein the blend is formed with between 50% by weight and 75% by weight paper dust, between 12.5% by weight and 15% by weight corn starch, and between 15% by weight and 30% by weight water.

* * * * *